United States Patent
Stamoulis

(10) Patent No.: US 8,036,135 B2
(45) Date of Patent: Oct. 11, 2011

(54) MAC PERFORMANCE OF A MESH NETWORK USING BOTH SENDER-BASED AND RECEIVER-BASED SCHEDULING

(75) Inventor: Anastasios Stamoulis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 402 days.

(21) Appl. No.: 11/548,679

(22) Filed: Oct. 11, 2006

(65) Prior Publication Data

US 2007/0201370 A1    Aug. 30, 2007

Related U.S. Application Data

(60) Provisional application No. 60/729,046, filed on Oct. 21, 2005.

(51) Int. Cl.
*H04L 12/26* (2006.01)
*H04L 12/28* (2006.01)
*H04L 1/18* (2006.01)
*H04L 1/14* (2006.01)

(52) U.S. Cl. ........ 370/252; 370/412; 714/748; 714/749; 714/750

(58) Field of Classification Search .............. 370/395.4, 370/412, 252; 709/237; 714/748–750
See application file for complete search history.

(56) References Cited

U.S. PATENT DOCUMENTS

| | | | |
|---|---|---|---|
| 6,092,115 A | 7/2000 | Choudhury et al. | |
| 7,023,857 B1 * | 4/2006 | Chiussi et al. ............. | 370/395.4 |
| 7,085,256 B2 | 8/2006 | Ware et al. | |
| 2002/0056133 A1 * | 5/2002 | Fung et al. ............. | 725/118 |
| 2002/0184381 A1 * | 12/2002 | Ryan et al. ............. | 709/234 |
| 2003/0198204 A1 * | 10/2003 | Taneja et al. ............ | 370/332 |
| 2004/0218559 A1 * | 11/2004 | Kim et al. ............. | 370/318 |
| 2005/0025114 A1 | 2/2005 | Ware et al. | |
| 2005/0058151 A1 * | 3/2005 | Yeh ............. | 370/445 |
| 2005/0243776 A1 * | 11/2005 | Kawabata et al. ........... | 370/337 |
| 2005/0265345 A1 * | 12/2005 | Chen et al. .............. | 370/392 |
| 2006/0069954 A1 * | 3/2006 | Chen et al. ............. | 714/25 |
| 2006/0186202 A1 * | 8/2006 | Donner ............. | 235/386 |

FOREIGN PATENT DOCUMENTS

CN    1197558 A    10/1998

(Continued)

OTHER PUBLICATIONS

International Search Report—PCT/US06/060137—International Search Authority—European Patent Office—Mar. 30, 2007.

(Continued)

*Primary Examiner* — Marsha D Banks Harold
*Assistant Examiner* — Saad Hassan
(74) *Attorney, Agent, or Firm* — Dang M. Vo; Nicholas J. Pauley; Jonathan T. Velasco

(57) ABSTRACT

Systems and methodologies are described that facilitate determining when and whether to implement a sender-based data packet scheduling mechanism or a receiver-based data packet scheduling mechanism based on one or mode scheduling factors. For example, a sending node and a receiving node may communicate to permit a determination of which node is more capable of performing the scheduling tasks, and a corresponding scheduling technique may be selected and executed. According to an aspect, an amount of data downloading may be compared to an amount of data uploading at each node, and a sender-based scheduling protocol may be performed when the amount of data uploading is greater than the amount of downloading data.

42 Claims, 10 Drawing Sheets

FOREIGN PATENT DOCUMENTS

| | | |
|---|---|---|
| JP | 07297829 | 11/1995 |
| JP | 2002345014 A | 11/2002 |
| JP | 2003023430 A | 1/2003 |
| TW | 484283 | 4/2002 |
| TW | 589837 | 6/2004 |
| TW | 232660 | 5/2005 |
| WO | 2004075569 | 9/2004 |
| WO | WO2004075568 | 9/2004 |

OTHER PUBLICATIONS

Written Opinion—PCT/US06/060137—International Search Authority—European Patent Office—Mar. 30, 2007.

International Preliminary Report on Patentability—PCT/US06/060137—International Preliminary Examination Authority—European Patent Office—Jan. 14, 2008.

Taiwanese Search Report—095138841—TIPO—Dec. 13, 2009.

* cited by examiner

MAC PERFORMANCE OF A MESH NETWORK USING BOTH SENDER-BASED AND RECEIVER-BASED SCHEDULING

CLAIM OF PRIORITY UNDER 35 U.S.C. §119

This application claims the benefit of U.S. Provisional Application Ser. No. 60/729,046, entitled "SENDER-BASED AND RECEIVER-BASED SCHEDULING IN A MESH NETWORK," filed on Oct. 21, 2005, the entirety of which is incorporated herein by reference.

BACKGROUND

I. Field

The following description relates generally to wireless communications, and more particularly to reducing interference in a wireless communication environment.

II. Background

Wireless communication systems have become a prevalent means by which a majority of people worldwide has come to communicate. Wireless communication devices have become smaller and more powerful in order to meet consumer needs and to improve portability and convenience. The increase in processing power in mobile devices such as cellular telephones has lead to an increase in demands on wireless network transmission systems. Such systems typically are not as easily updated as the cellular devices that communicate there over. As mobile device capabilities expand, it can be difficult to maintain an older wireless network system in a manner that facilitates fully exploiting new and improved wireless device capabilities.

More particularly, frequency division based techniques typically separate the spectrum into distinct channels by splitting it into uniform chunks of bandwidth, for example, division of the frequency band allocated for wireless communication can be split into 30 channels, each of which can carry a voice conversation or, with digital service, carry digital data. Each channel can be assigned to only one user at a time. One known variant is an orthogonal frequency division technique that effectively partitions the overall system bandwidth into multiple orthogonal subbands. These subbands are also referred to as tones, carriers, subcarriers, bins, and/or frequency channels. Each subband is associated with a subcarrier that can be modulated with data. With time division based techniques, a band is split time-wise into sequential time slices or time slots. Each user of a channel is provided with a time slice for transmitting and receiving information in a round-robin manner. For example, at any given time t, a user is provided access to the channel for a short burst. Then, access switches to another user who is provided with a short burst of time for transmitting and receiving information. The cycle of "taking turns" continues, and eventually each user is provided with multiple transmission and reception bursts.

Code division based techniques typically transmit data over a number of frequencies available at any time in a range. In general, data is digitized and spread over available bandwidth, wherein multiple users can be overlaid on the channel and respective users can be assigned a unique sequence code. Users can transmit in the same wide-band chunk of spectrum, wherein each user's signal is spread over the entire bandwidth by its respective unique spreading code. This technique can provide for sharing, wherein one or more users can concurrently transmit and receive. Such sharing can be achieved through spread spectrum digital modulation, wherein a user's stream of bits is encoded and spread across a very wide channel in a pseudo-random fashion. The receiver is designed to recognize the associated unique sequence code and undo the randomization in order to collect the bits for a particular user in a coherent manner.

A typical wireless communication network (e.g., employing frequency, time, and code division techniques) includes one or more base stations that provide a coverage area and one or more mobile (e.g., wireless) terminals that can transmit and receive data within the coverage area. A typical base station can simultaneously transmit multiple data streams for broadcast, multicast, and/or unicast services, wherein a data stream is a stream of data that can be of independent reception interest to a mobile terminal. A mobile terminal within the coverage area of that base station can be interested in receiving one, more than one or all the data streams carried by the composite stream. Likewise, a mobile terminal can transmit data to the base station or another mobile terminal. Such communication between base station and mobile terminal or between mobile terminals can be degraded due to channel variations and/or interference power variations. Accordingly, a need in the art exists for systems and/or methodologies that facilitate reducing interference and improving throughput in a wireless communication environment.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with various aspects, scheduling factors may be evaluated for nodes (e.g., access points, access terminals, . . . ) that are party to a data packet transmission, and a selection may be made between a sender-based scheduling protocol and a receiver-based scheduling protocol as a function of the scheduling factors. Scheduling factors may comprise node topology (e.g., weights associated with sending and receiving nodes), traffic between nodes, interference experienced at respective nodes, a ratio of uploading activity to downloading activity at a given node, etc. According to some aspects, a sending node and a receiving node may communicate and agree to utilize one of a sender-based scheduling mechanism and a receiver-based mechanism. Under the sender-based protocol, a node that desires to transmit a data packet may advertise the fact that a packet is ready for transmission, and may receive an acknowledgement from the receiving node that it is ready to receive the packet. The sending node may then select a subset of available carriers and transmit the data packet to the receiving node. Under a receiver-based protocol, the sending node transmits a request for resources and the receiving node grants a subset of available resources over which the sending node may transmit the data packet. Selection between sender-based and receiver-based scheduling protocols may be a function of a comparison of an amount of downloading to an amount of uploading at one or both nodes involved in the data transmission.

According to an aspect, a method of scheduling data packets for transmission in a wireless network may comprise determining an amount of downloading relative to an amount of uploading at a first node, and scheduling a data packet for transmission by utilizing at least one of a sender-based scheduling technique and a receiver-based scheduling technique, wherein the utilized scheduling technique is selected as a function of the determination of the amount of downloading relative to the amount of uploading. The method may further comprise utilizing the sender-based scheduling technique if the amount of downloading is greater than the amount of uploading, and utilizing the receiver-based scheduling technique if the amount of downloading is less than or equal to the amount of uploading.

According to another aspect, an apparatus that facilitates dynamically scheduling data packet transfer may comprise a determination module that determines an amount of downloading relative to an amount of uploading at a first node, and a scheduler that schedules a data packet for transmission by utilizing at least one of a sender-based scheduling technique and a receiver-based scheduling technique, wherein the utilized scheduling technique is selected as a function of the determination of the amount of downloading relative to the amount of uploading. The determination module may select the sender-based scheduling technique if the amount of downloading is greater than the amount of uploading, and may select the receiver-based scheduling technique if the amount of downloading is less than the amount of uploading.

According to yet another aspect, an apparatus that facilitates scheduling data packets for transmission in a wireless communication environment may comprise means for determining an amount of downloading relative to an amount of uploading at a first node, and means for scheduling a data packet for transmission by utilizing at least one of a sender-based scheduling technique and a receiver-based scheduling technique, wherein the utilized scheduling technique is selected as a function of the determination of the amount of downloading relative to the amount of uploading.

Yet another aspect relates to a machine-readable medium comprising instructions for scheduling data packet transmission in a wireless communication environment, the instructions upon execution cause a machine to determine an amount of downloading relative to an amount of uploading at a first node, and schedule a data packet for transmission by utilizing at least one of a sender-based scheduling technique and a receiver-based scheduling technique, wherein the utilized scheduling technique is selected as a function of the determination of the amount of downloading relative to the amount of uploading.

Still another aspect relates to a processor for scheduling data packets for transmission, the processor being configured to determine an amount of downloading relative to an amount of uploading at a first node, and to schedule a data packet for transmission by utilizing at least one of a sender-based scheduling technique and a receiver-based scheduling technique, wherein the utilized scheduling technique is selected as a function of the determination of the amount of downloading relative to the amount of uploading.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects may be employed and the described aspects are intended to include all such aspects and their equivalents.

DETAILED DESCRIPTION

Figure 1:
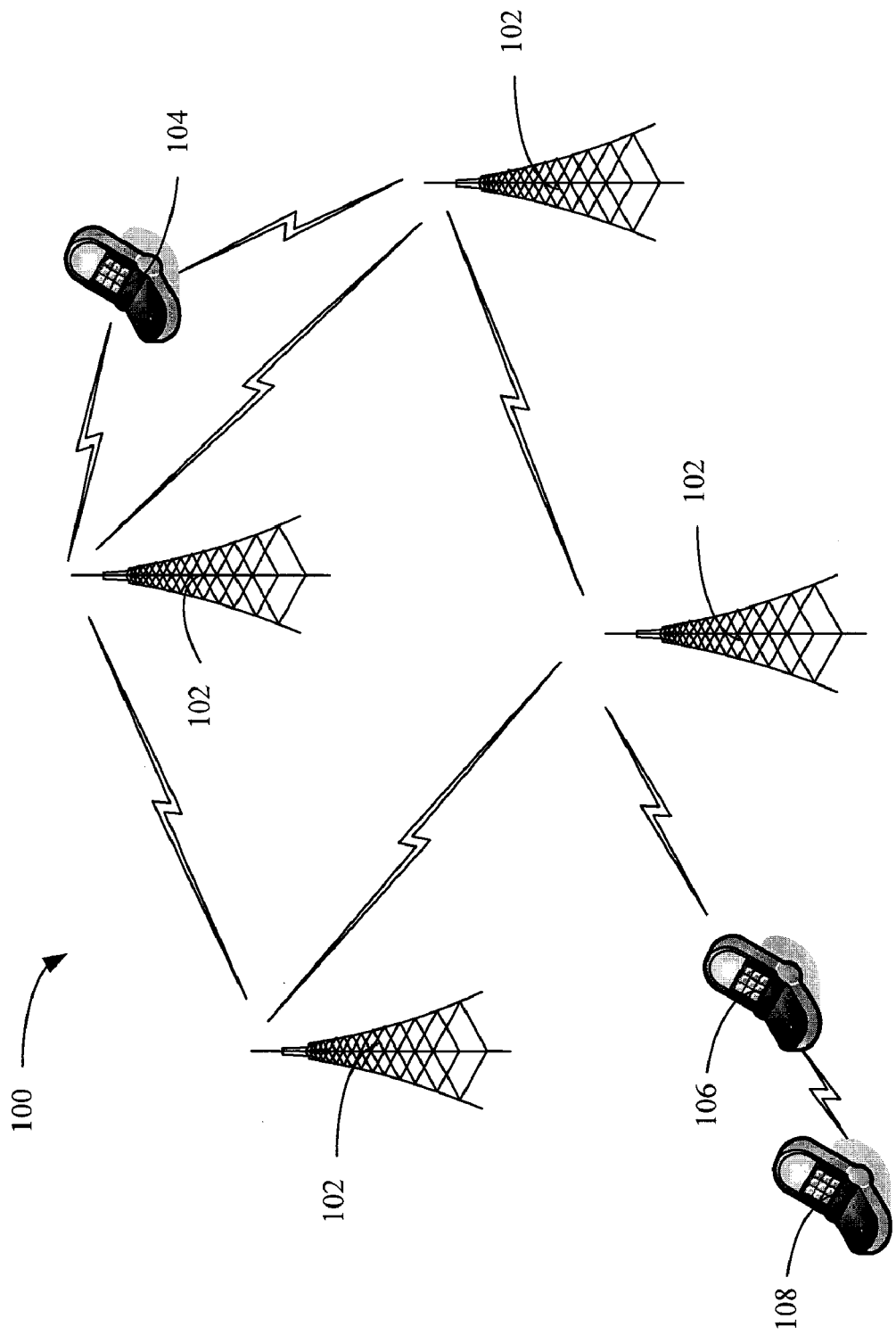
FIG. 1 is an illustration of an ad hoc, or random, wireless communication environment, in accordance with various aspects.

Various aspects are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "system," and the like are intended to refer to a computer-related entity, either hardware, software, software in execution, firmware, middle ware, microcode, and/or any combination thereof. For example, a component may be, but is not limited to being, a process running on a processor, a processor, an object, an executable, a thread of execution, a program, and/or a computer. One or more components may reside within a process and/or thread of execution and a component may be localized on one computer and/or distributed between two or more computers. Also, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal). Additionally, components of systems described herein may be rearranged and/or complimented by additional components in order to facilitate achieving the various aspects, goals, advantages, etc., described with regard thereto, and are not limited to the precise configurations set forth in a given figure, as will be appreciated by one skilled in the art.

Furthermore, various aspects are described herein in connection with a subscriber station. A subscriber station can also be called a system, a subscriber unit, mobile station, mobile, remote station, access point, remote terminal, access terminal, user terminal, user agent, a user device, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. It will be appreciated that the word "exemplary" is used herein to mean "serving as an example, instance, or illustration." Any aspect or design described herein as "exemplary" is not necessarily to be construed as preferred or advantageous over other aspects or designs.

FIG. 1 is an illustration of an ad hoc, or random, wireless communication environment 100, in accordance with various aspects. System 100 may comprise one or more access points 102, which may be fixed, mobile, radio, Wi-Fi, etc., in one or more sectors that receive, transmit, repeat, etc., wireless communication signals to each other and/or to one or more access terminals 104, 106, 108. Each access point 102 may comprise a transmitter chain and a receiver chain, each of which may in turn comprise a plurality of components associated with signal transmission and reception (e.g., processors, modulators, multiplexers, demodulators, demultiplexers, antennas, etc.), as will be appreciated by one skilled in the art. Access terminals 104 may be, for example, cellular phones, smart phones, laptops, personal computers, handheld communication devices, handheld computing devices, satellite radios, global positioning systems, PDAs, and/or any other suitable device for communicating over wireless network 100. System 100 can be employed in conjunction with various aspects described herein in order facilitate providing scalable resource reuse in a wireless communication environment, as set forth with regard to subsequent figures.

Access terminals 104, 106, 108 are typically dispersed throughout the system, and each terminal may be fixed or mobile. A terminal may also be called a mobile station, user equipment, a user device, or some other terminology. A terminal may be a wireless device, a cellular phone, a personal digital assistant (PDA), a wireless modem card, and so on. Each terminal 104, 106, 108 may communicate with zero, one, or multiple access points on the downlink and uplink at any given moment. The downlink (or forward link) refers to the communication link from the access points to the terminals, and the uplink (or reverse link) refers to the communication link from the terminals to the base stations.

For a distributed architecture, access points 102 may communicate with one another as needed. Data transmission on the forward link occurs from one access point to one access terminal at or near the maximum data rate that can be supported by the forward link and/or the communication system. Additional channels of the forward link (e.g., control channel) may be transmitted from multiple access points to one access terminal. Reverse link data communication may occur from one access terminal to one or more access points.

According to other aspects, the ad hoc network may be a multi-hop ad hoc network, wherein an access terminal 108 utilizes another access terminal 106 as a relay to an access point 102. For instance, access terminal 108 may determine that it does not have sufficient signal strength to transmit to an access point 102, but that access terminal 106 does have sufficient signal strength. In such a case, access terminal 108 may route reverse link communication through access terminal 106 to one or more access points 102. Thus, access terminal 106 may act as an access point for access terminal 108.

Figure 2:
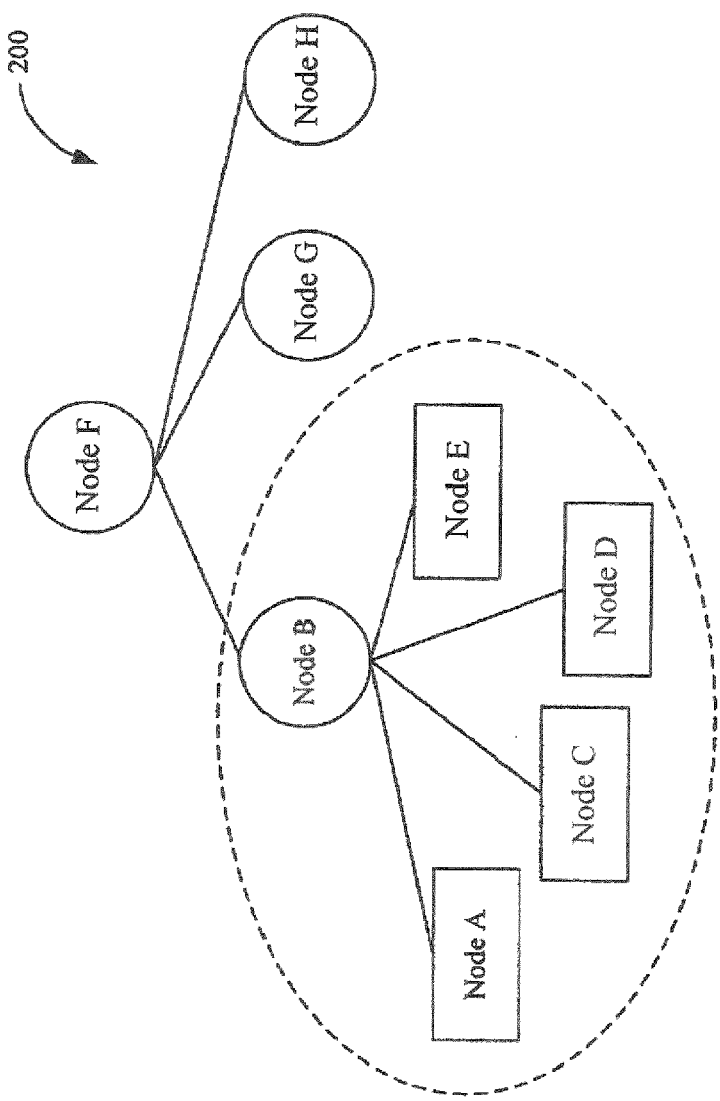
FIG. 2 is an illustration of a routing tree that facilitates performing sender-based or receiver-based scheduling, or both, in accordance with a plurality of aspects described herein.

FIG. 2 is an illustration of a routing tree 200 that facilitates performing sender-based or receiver-based scheduling, or both, in accordance with a plurality of aspects described herein. Indeed, several types of communication systems may utilize the above-described aspects. For example, in an "isolated" wired access point scenario, there may be 10 to 30 access terminals talking to a single access point (e.g., without peer-to-peer communication between the access points). The wired access point may thus be viewed as a base-station of a tiny cell. Furthermore, in such a deployment, there may be heavy downloading, and, as a result, it may be desirable to put much of the responsibility of the scheduling at the sender-side.

Additionally, cluster heads and/or nodes with many outgoing but few incoming connections in routing tree 200 may see improvements in throughput when employing the systems and methods described herein. Consider a node B in the routing tree 200 shown in FIG. 2. The node B may decide to apply sender-based scheduling when communicating with node A. Generalizing these two cases, nodes that have a relatively better knowledge of the interference environment or the traffic mix may be candidates for sender-based scheduling. Additionally, a node may utilize traffic mix (e.g., a ratio of uploading to downloading), perceived interference, or a combination thereof, when determining whether to use sender-based or receiver-based scheduling.

For example, a node that utilizes traffic mix to determine whether to use sender-based or receiver-based scheduling may determine that a neighboring node is executing a gaming application, and may infer that it may be desirable to utilize interference as a parameter to select a scheduling mechanism, in order to ensure that the neighboring node does not experience undue signal delay as a result of a transmission that may otherwise be scheduled using traffic mix as a factor. In this manner, an access terminal may utilize either or both of traffic mix and potential interference to select a scheduling mechanism in a manner that maximizes throughput for the access terminal as well as for any neighboring access terminals that might be impacted.

Figure 3:
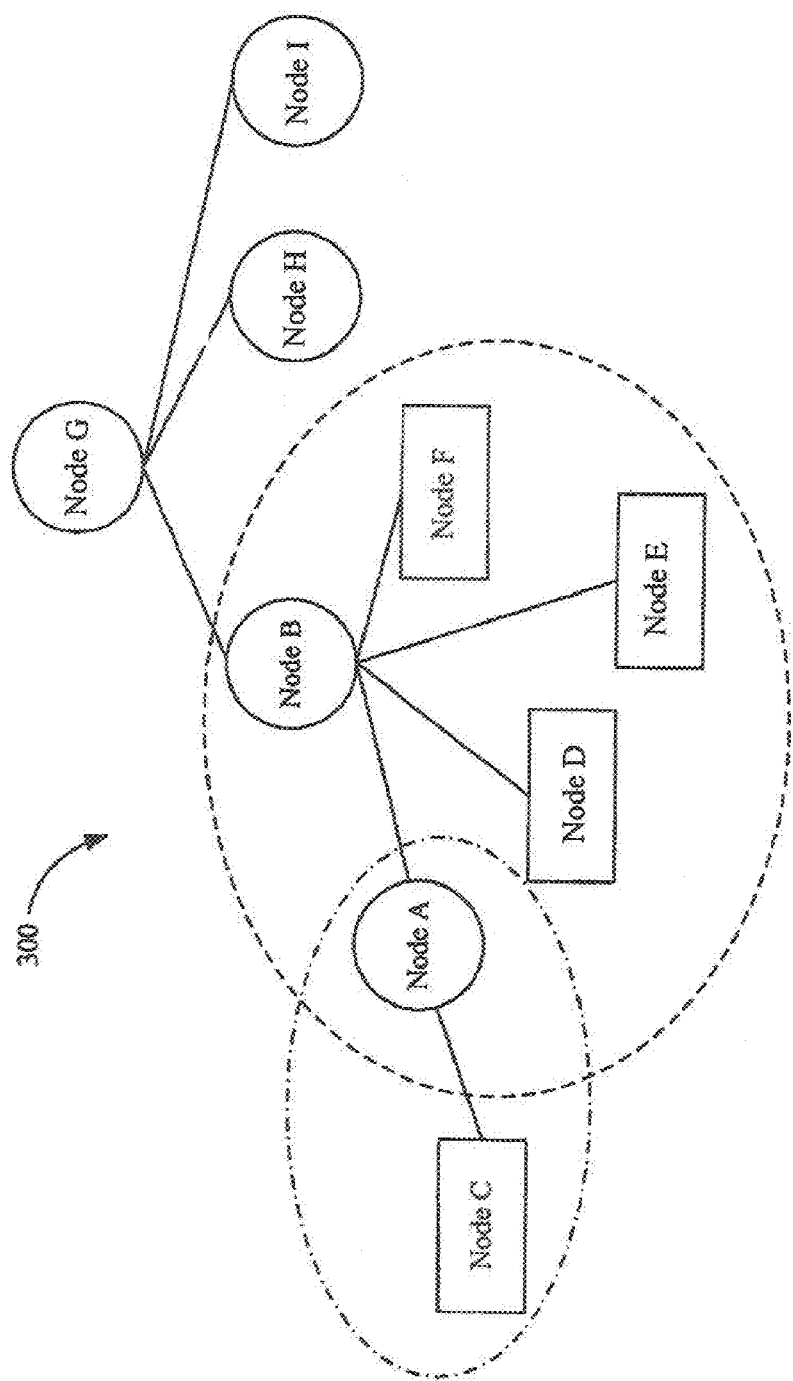
FIG. 3 is an illustration of a routing tree that facilitates performing time-division techniques between either or both of sender-based and receiver-based scheduling, in accordance with one or more aspects.

FIG. 3 is an illustration of a routing tree 300 that facilitates performing time-division techniques between either or both of sender-based and receiver-based scheduling, in accordance with one or more aspects. For instance, some nodes may choose to alternate between sender-based and receiver-based scheduling. Node A is a child of node B, which has many children; of these children, only node A serves as a relay node to node C. If node B wants to transmit a packet to A, node B may employ a sender-based scheduling protocol without sending a request to node A; furthermore, node B may send a data packet to node A on the subcarriers that node B itself has selected.

Conversely, if node C wants to transmit a packet to node A, then node C may send a request to node A, and node A may notify node C which subcarriers node C is allowed to use (e.g., a grant). Consequently, in this case node A is in "sender-based scheduling" mode regarding its communication with node B, but in "receiver-based scheduling" mode regarding its communication with node C. The foregoing may be described as follows: node A is a "slave" to node B (which acts as a "master"), while node A is a "master" to "slave" node C.

Figure 4:
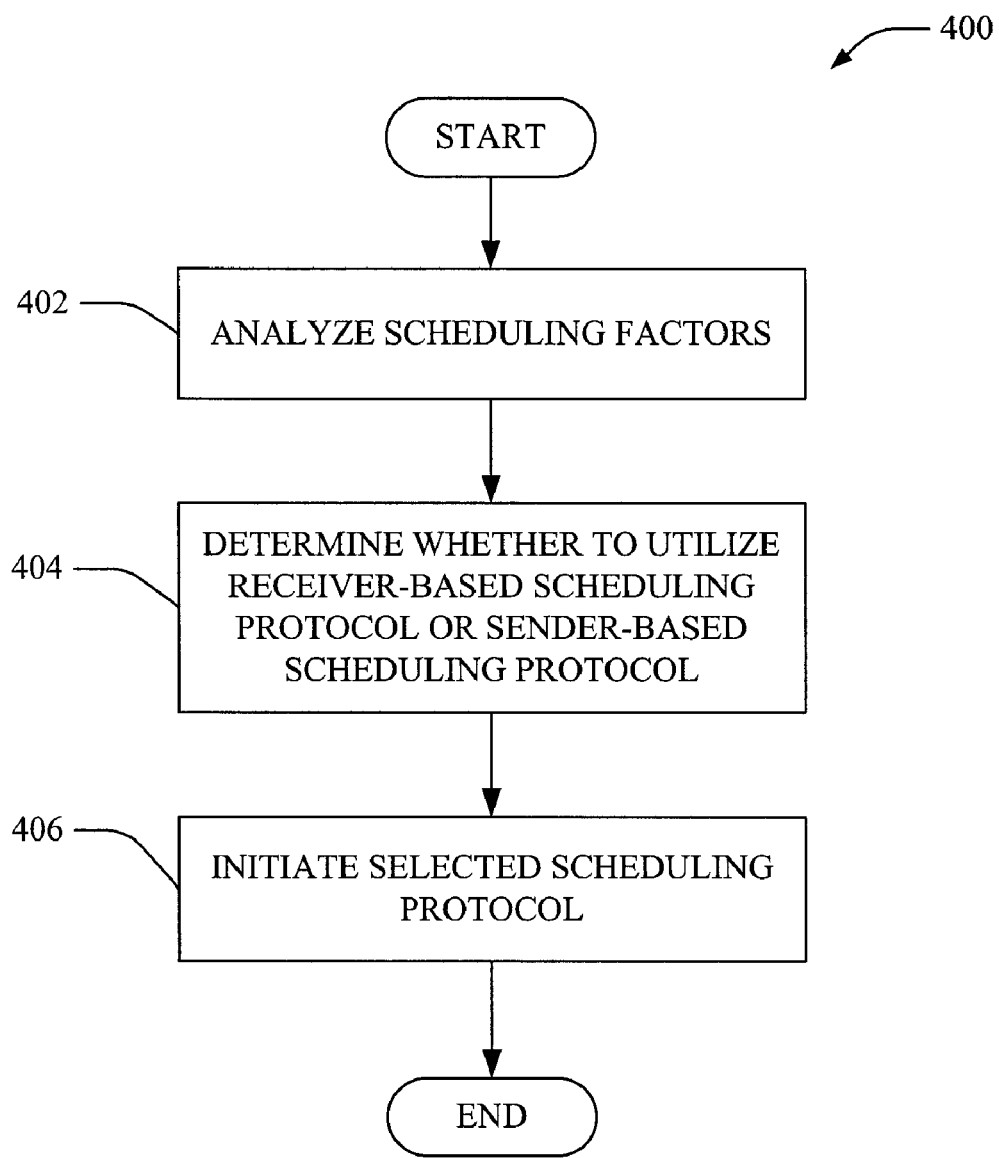
FIG. 4 is an illustration of a methodology that facilitates performing a dynamic determination regarding whether to employ a sender-based data packet scheduling technique or a receiver-based data packet scheduling technique, depending on a plurality of scheduling factors, in accordance with one or more aspects.
Figure 5:
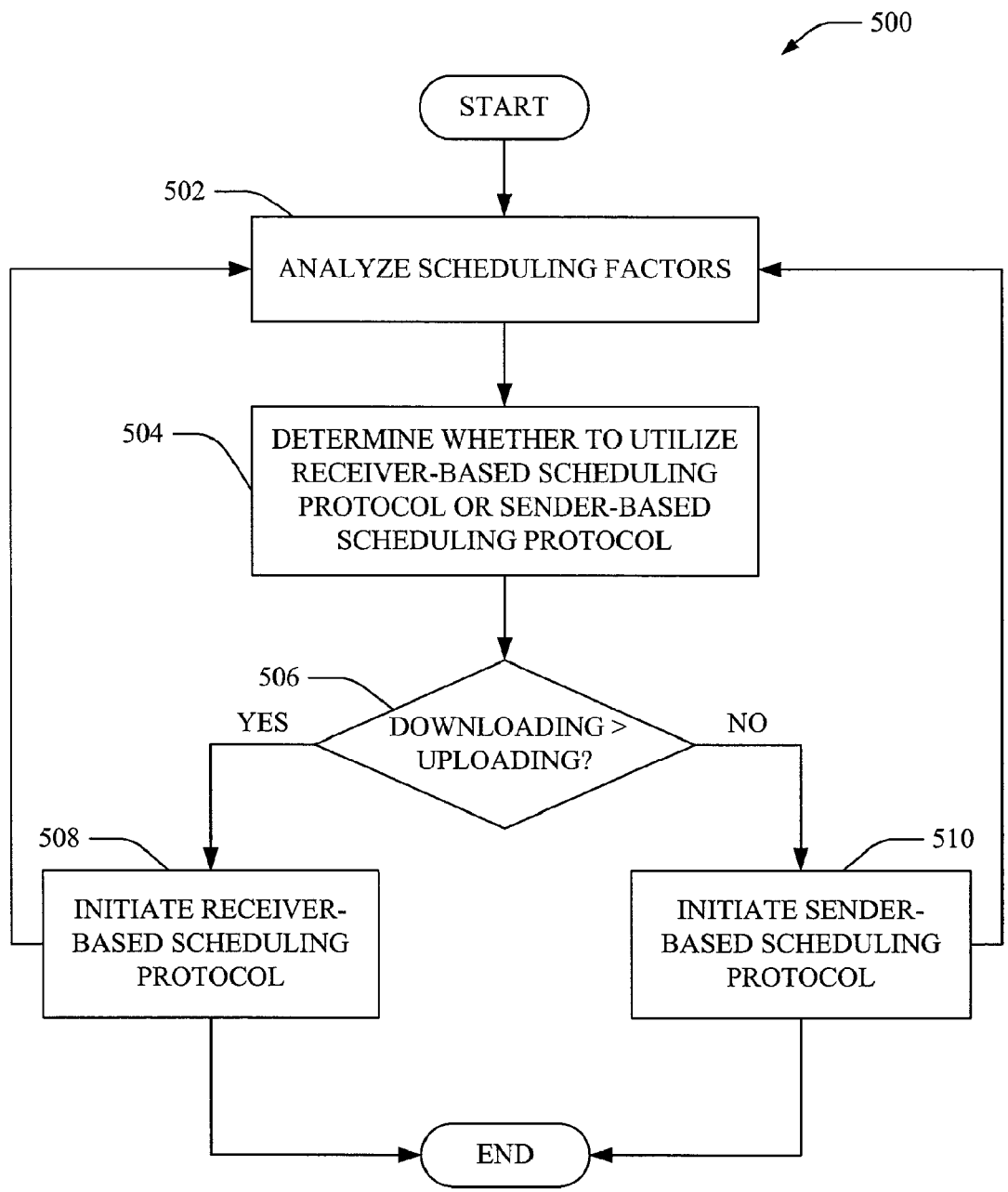
FIG. 5 is an illustration of a method for dynamically scheduling data packet transfer based on a plurality of factors, in accordance with one or more aspects.
Figure 6:
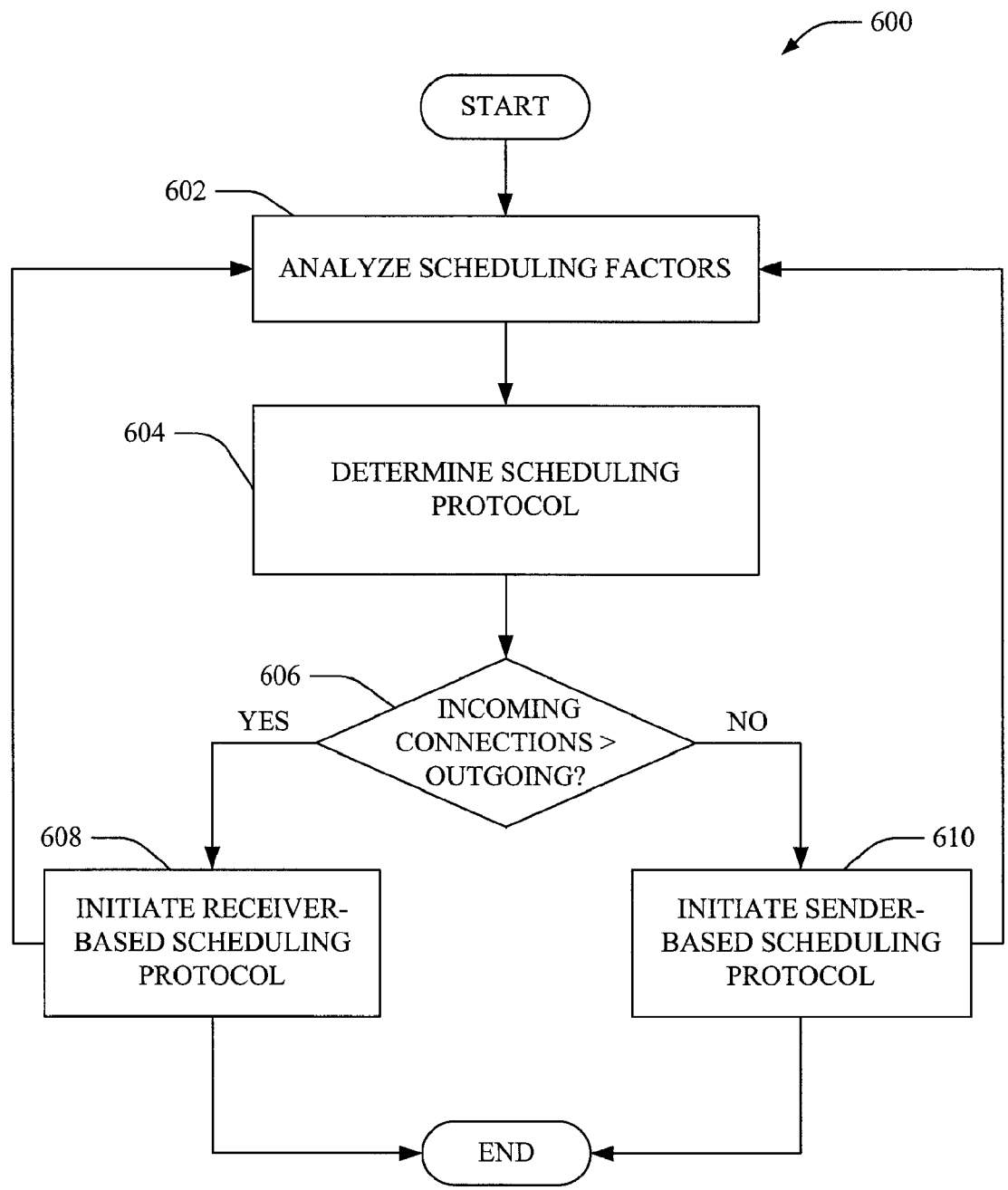
FIG. 6 illustrates a methodology for dynamically scheduling data packet transfer based on a number of connections at nodes involved in data transmission, in accordance with one or more aspects.

Referring to FIGS. 4-6, methodologies relating to performing sender-based and receiver-based scheduling are illustrated. For example, methodologies can relate to performing sender-based and receiver-based scheduling in an FDMA environment, an OFDMA environment, a CDMA environment, a WCDMA environment, a TDMA environment, an SDMA environment, or any other suitable wireless environment. While, for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

FIG. 4 is an illustration of a methodology 400 that facilitates performing a dynamic determination regarding whether to employ a sender-based data packet scheduling technique or a receiver-based data packet scheduling technique, depending on a plurality of scheduling factors, in accordance with one or more aspects. At 402, scheduling factors may be analyzed and/or evaluated to permit an assessment of resource occupation at respective sending and receiving nodes. For example, scheduling factors may comprise weights associated with nodes between which the data packet is to be transmitted, physical distance between nodes, traffic mix (e.g., data traffic, control signal traffic, paging signals, etc.) between nodes, interference caused by neighboring nodes, and the like. At 404, a determination may be made regarding whether the sending node should schedule the data packet for transmission (e.g., sender-based scheduling) or whether the receiving node should schedule the transmission of the data packet (receiver-based scheduling).

A sender-based scheduling protocol may comprise, for example, a sender node that advertises (e.g., through a paging channel) that there is a data packet that needs to be scheduled for transmission to a receiver node. The receiver node may then respond to the sender node with an indication that it is ready to receive the data packet. The sender node may select one or more channels or subcarriers and transmit the data packet to the receiver node. A receiver-based scheduling technique may comprise, for example, a sender node that transmits a request to send a data packet to a receiver node. The receiver node may then send a grant back tot the sender node to indicate one or more channels or subcarriers over which the sender node may transmit the data packet. Based on the analysis of the scheduling factors, the sending and receiving nodes may initiate and execute either a receiver-based scheduling protocol or a sender-based scheduling protocol, at 406. In this manner, a dynamic determination of a relative measure of congestion at sending and receiving nodes may be made to facilitate selecting an efficient scheduling protocol.

FIG. 5 is an illustration of a method 500 for dynamically scheduling data packet transfer based on a plurality of factors, in accordance with one or more aspects. At 502, scheduling factors may be analyzed, which may include, without being limited to, routing topology (e.g., weights associated with nodes involved in the transmission), clustering (e.g., of nodes), traffic mix, interference from other nodes, and the like. Depending on analysis of the scheduling factors, a determination may be made, at 504, regarding whether to utilize a receiver-based scheduling protocol or a sender-based scheduling protocol. The determination may be based solely on the analysis of scheduling factors performed at 502, or may comprise an additional determination regarding whether the transmission in question is mostly download-oriented or mostly upload-oriented (e.g., whether an amount of downloaded data is greater than an amount of uploaded data, or vice versa) at 506. If it is determined that the amount of downloading is greater than the amount of uploading, then the method may proceed to 508, where a receiver-based scheduling protocol may be initiated to schedule transmission of the data packet. If the amount of downloading is not greater than the amount of uploading, then at 510, a sender-based scheduling protocol may be initiated to schedule transmission of the data packet. In cases where the download and upload portions of data are equal, either scheduling protocol may be utilized. Alternatively, if desired, on or the other scheduling protocol may be designated as a preferred protocol when the data transmission comprises equal download and upload portions. Method 500 may terminate after the data packet has been scheduled according to the selected protocol. Additionally or alternatively, method 500 may revert to 502 for further iteration (e.g., analysis of scheduling factors, transmission features, and protocol selection for additional data packets) in order to provide dynamic scheduling of transmissions in accordance with various aspects.

Thus, method 500 may be utilized to ensure that nodes in a network operate either under sender-based or receiver-based scheduling. According to various aspects, the sender-based or receiver-based scheduling may be performed in a static fashion. According to other aspects, a dynamic determination may be made regarding whether sender-based scheduling or receiver-based scheduling is performed at any given point. The dynamic determination may be based on, for instance be a large time scale; for example, wired access points may be set up to use server-based scheduling as a default. Additionally or alternatively, the dynamic determination may be based on a relatively small time scale; for instance, wireless access points which act as relays may perform time-division protocols between server-based or receiver-based scheduling. According to other aspects, server-based scheduling may be employed as a default mode at some nodes.

The following example related to an access point that desires to transmit a packet to an access terminal. Under "receiver-based" scheduling, the access point sends a request to the access terminal, which need not be performed through a separate transmission, but rather may be embedded in packets between the access point and access terminal. If the access terminal has sufficient resources (e.g., subcarriers or codes), the access terminal sends back a grant to the access point, indicating the channel on which the access point may transmit. Under "sender-based" scheduling, the access point may advertise (e.g., through a paging channel) to the access terminal that there is a data packet. The access terminal may respond and notifies the access point that it is ready to receive the packet. The access point then transmits the packet on the channel (e.g., set of subcarriers, time slot, code signature, . . . ) that the access point has chosen.

FIG. 6 illustrates a methodology 600 for dynamically scheduling data packet transfer based on a number of connections at nodes involved in data transmission, in accordance with one or more aspects. According to an example, a node may have an impending data transmission and may desire to determine whether it should schedule the transmission (e.g., as the sender node) or whether it should defer to a receiver node to schedule the transmission. At 602, scheduling factors may be analyzed, which may comprise routing topology, clustering of nodes, traffic mix, interference from neighboring nodes, and the like. A scheduling protocol may be determined or selected, at 604. The determination may be based solely on the analysis of scheduling factors performed at 602, or may comprise an additional determination regarding a ratio of incoming connections to outgoing connections (e.g., whether a number of signals being received is greater than a number of signals being transmitted, or vice versa) at 606. If it is determined that the number of incoming connections is greater than the number of outgoing connections, then the method may proceed to 608, where a receiver-based scheduling protocol may be initiated to schedule transmission of the data packet. If the number of incoming connections is less than the number of outgoing connections, then at 610, a sender-based scheduling protocol may be initiated to schedule transmission of the data packet. In cases where the numbers of incoming and outgoing connections are equal, either scheduling protocol may be utilized. According to another aspect, one scheduling protocol may be designated as a preferred protocol when the data transmission comprises equal download and upload portions. Method 600 may terminate after the data packet has been scheduled according to the selected protocol. Additionally or alternatively, method 600 may revert to 602 for further iteration (e.g., analysis of scheduling factors, transmission features, and protocol selection for additional data packets) in order to provide dynamic scheduling of transmissions in accordance with various aspects.

Method 600 may be utilized to ensure that nodes in a network operate either under sender-based or receiver-based scheduling. According to various aspects, the sender-based or receiver-based scheduling may be performed in a static fashion. According to other aspects, a dynamic determination may be made regarding whether sender-based scheduling or receiver-based scheduling is performed at any given point. The dynamic determination may be based on, for instance, a large time scale. For example, wired access points may be set up to utilize a server-based scheduling protocol as a default. Additionally or alternatively, the dynamic determination may be based on a relatively small time scale. For instance, wireless access points that act as relays may perform time-division protocols between server-based or receiver-based scheduling protocols. According to other aspects, server-based scheduling may be employed as a default technique at some nodes.

Figure 7:
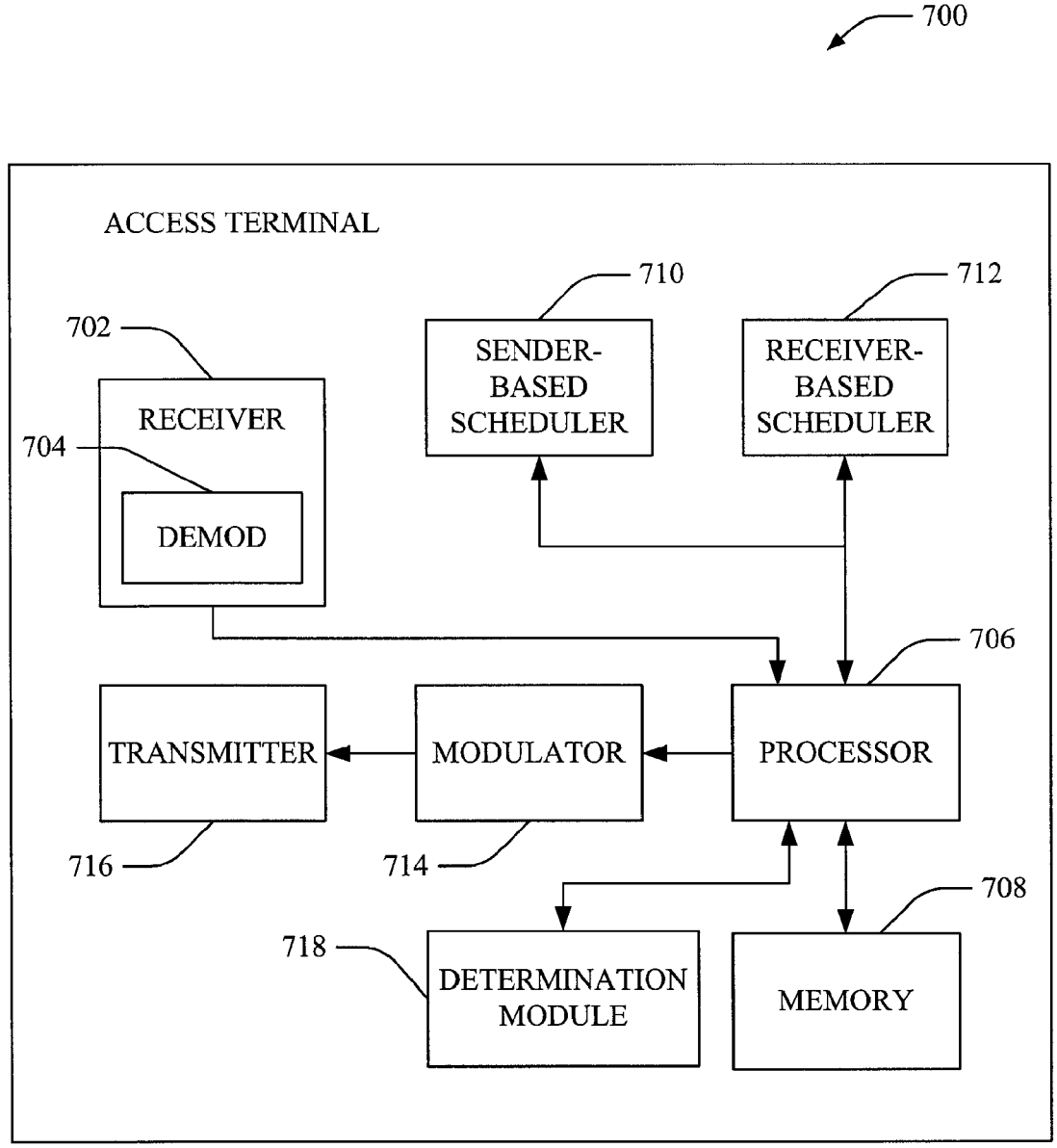
FIG. 7 is an illustration of an access terminal that facilitates selecting between and performing sender-based and receiver-based scheduling protocols in an ad hoc wireless communication network, in accordance with one or more aspects.

FIG. 7 is an illustration of an access terminal 700 that facilitates selecting between and performing sender-based and receiver-based scheduling protocols in an ad hoc wireless communication network, in accordance with one or more aspects. Access terminal 700 comprises a receiver 702 that receives a signal from, for instance, a receive antenna (not shown), and performs typical actions thereon (e.g., filters, amplifies, downconverts, etc.) the received signal and digitizes the conditioned signal to obtain samples. Receiver 702 can comprise a demodulator 704 that demodulates received signals and provides them to a processor 706 for channel estimation. Processor 706 may be a processor dedicated to analyzing information received by receiver 702 and/or generating information for transmission by a transmitter 716, a processor that controls one or more components of access terminal 700, and/or a processor that both analyzes information received by receiver 702, generates information for transmission by transmitter 716, and controls one or more components of access terminal 700. Additionally, processor 706 may be coupled to an determination module 718 that may execute instructions for comparing an amount of downloading to an amount of uploading for access terminal 700, for comparing a number of incoming connections to a number of outgoing connections, for evaluating scheduling factors and determining whether to execute a sender-based data packet scheduling protocol or a receiver-based data packet scheduling protocol, etc.

Access terminal 700 can additionally comprise memory 708 that is operatively coupled to processor 706 and that may store data to be transmitted, received data, and the like. Memory 708 may store information related to a number of incoming connections, a number of outgoing connections, an amount of downloading, an amount of uploading, protocols for comparing such values, protocols for selecting between sender-based and receiver-based scheduling techniques, etc.

It will be appreciated that the data store (e.g., memory 708) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 708 of the subject systems and methods is intended to comprise, without being limited to, these and any other suitable types of memory.

Receiver 702 is further operatively coupled to a sender-based scheduler 710, which may generate a signal to advertise to a receiving node (e.g., an access point, another access terminal, . . . ) that a data packet is ready for transmission, as described above. Upon receipt of an acknowledgement from the receiving node, sender-based scheduler may schedule the data packet on a selected set of channels or subcarriers for transmission to the receiving node by transmitter 716. Access terminal may additionally comprise a receiver-based scheduler 712 that may receive a resource request from a sending node (e.g., an access point, another access terminal, . . . ), in which the sending node indicates that it wishes to transmit a data packet. Receiver-based scheduler 712 may verify that it has sufficient resources (e.g., channels, subcarriers, codes, tones, . . . ) and may generate a grant of a subset of available resources to the sending node, which may then transmit the data packet to access terminal 700 over the granted subset of resources.

Access terminal 700 still further comprises a modulator 714 and a transmitter 716 that transmits the signal to, for instance, a base station, an access point, another access terminal, a remote agent, etc. Although depicted as being separate from the processor 706, it is to be appreciated that sender-based scheduler 710, receiver-based scheduler 712, and/or determination module 718 may be part of processor 706 or a number of processors (not shown).

Figure 8:
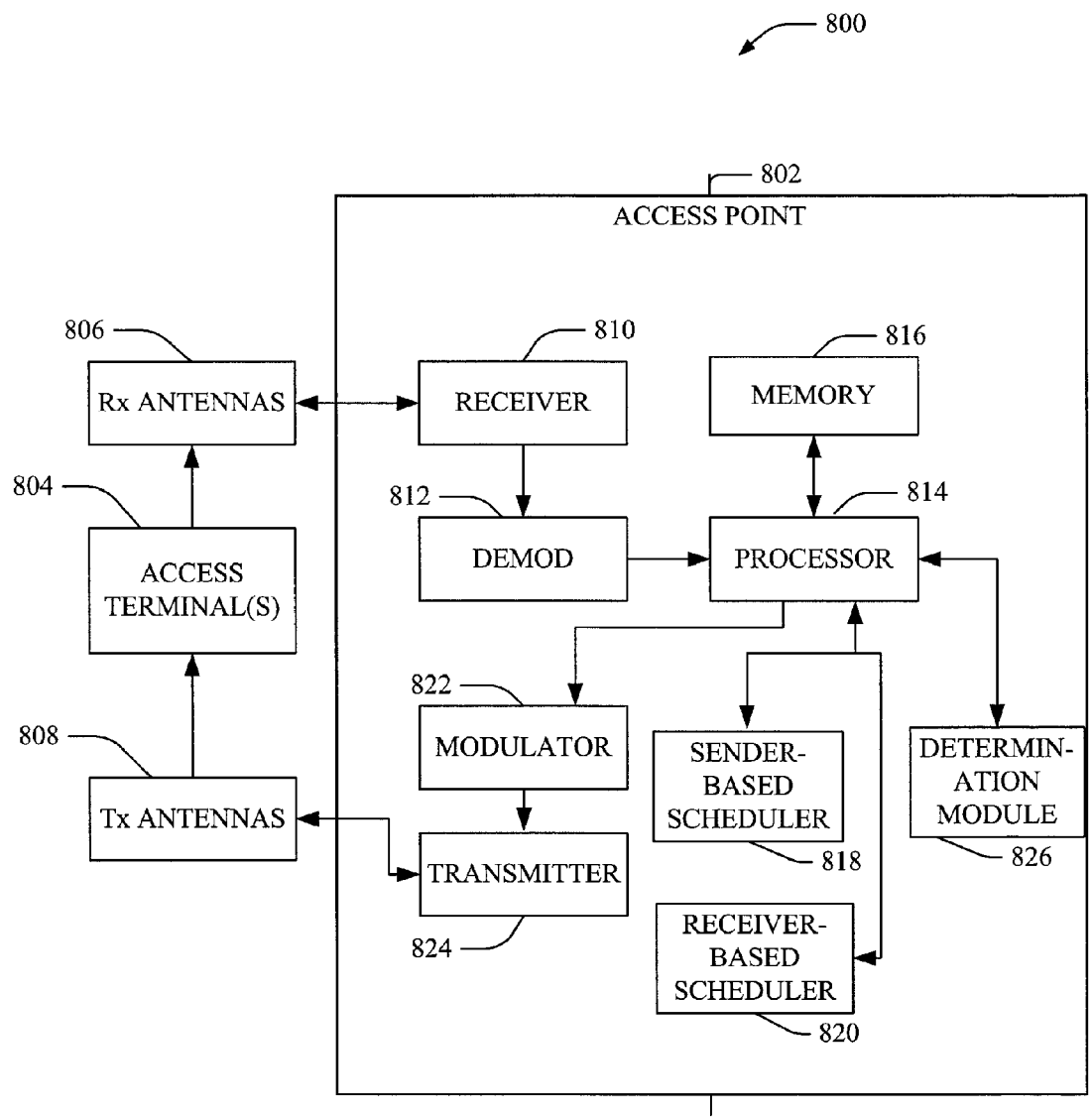
FIG. 8 is an illustration of a system 800 that facilitates performing a dynamic determination of whether to utilize a sender-based data packet scheduling technique or a receiver-based data packet scheduling technique, in accordance with one or more aspects.

FIG. 8 is an illustration of a system 800 that facilitates performing a dynamic determination of whether to utilize a sender-based data packet scheduling technique or a receiver-based data packet scheduling technique, in accordance with one or more aspects. System 800 comprises an access point 802 with a receiver 810 that receives signal(s) from one or more access terminals 804 through a plurality of receive antennas 806, and a transmitter 824 that transmits to the one or more access terminals 804 through a transmit antenna 808. Receiver 810 can receive information from receive antennas 806 and is operatively associated with a demodulator 812 that demodulates received information. Demodulated symbols are analyzed by a processor 814 that can be similar to the processor described above with regard to FIG. 7, and which is coupled to a memory 816 that stores information related a number of incoming connections, a number of outgoing connections, an amount of downloading, an amount of uploading, protocols for comparing such values, protocols for selecting between sender-based and receiver-based scheduling techniques, and/or any other suitable information related to performing the various actions and functions set forth herein.

Processor 814 may be further coupled to a sender-based scheduler 818 and a receiver-based scheduler 820, which may facilitate scheduling data packets upon a determination y processor 814 that either of the schedulers 818 and 820 will be utilized. Processor 814 and/or determination module 826 may execute instructions similar to those described above with regard to processor 706 and/or determination module 718. For example, sender-based scheduler 818 may generate a signal to advertise to a receiving node (e.g., another access point, an access terminal, . . . ) that a data packet is ready for transmission, as described above. Upon receipt of an acknowledgement from the receiving node, sender-based scheduler 818 may schedule the data packet on a selected set of channels or subcarriers for transmission to the receiving node by transmitter 824. According to another example, receiver-based scheduler 820 may receive a resource request from a sending node (e.g., another access point, an access terminal, . . . ), by which the sending node indicates that it wishes to transmit a data packet. Receiver-based scheduler 820 may grant a subset of available resources to the sending node, which may then transmit the data packet to access point 800 over the granted subset of resources. Although depicted as being separate from processor 814, it is to be appreciated that sender-based scheduler 818, receiver-based scheduler 820, modulator 822, and/or determination module 826 may be part of processor 814 or a number of processors (not shown).

Figure 9:
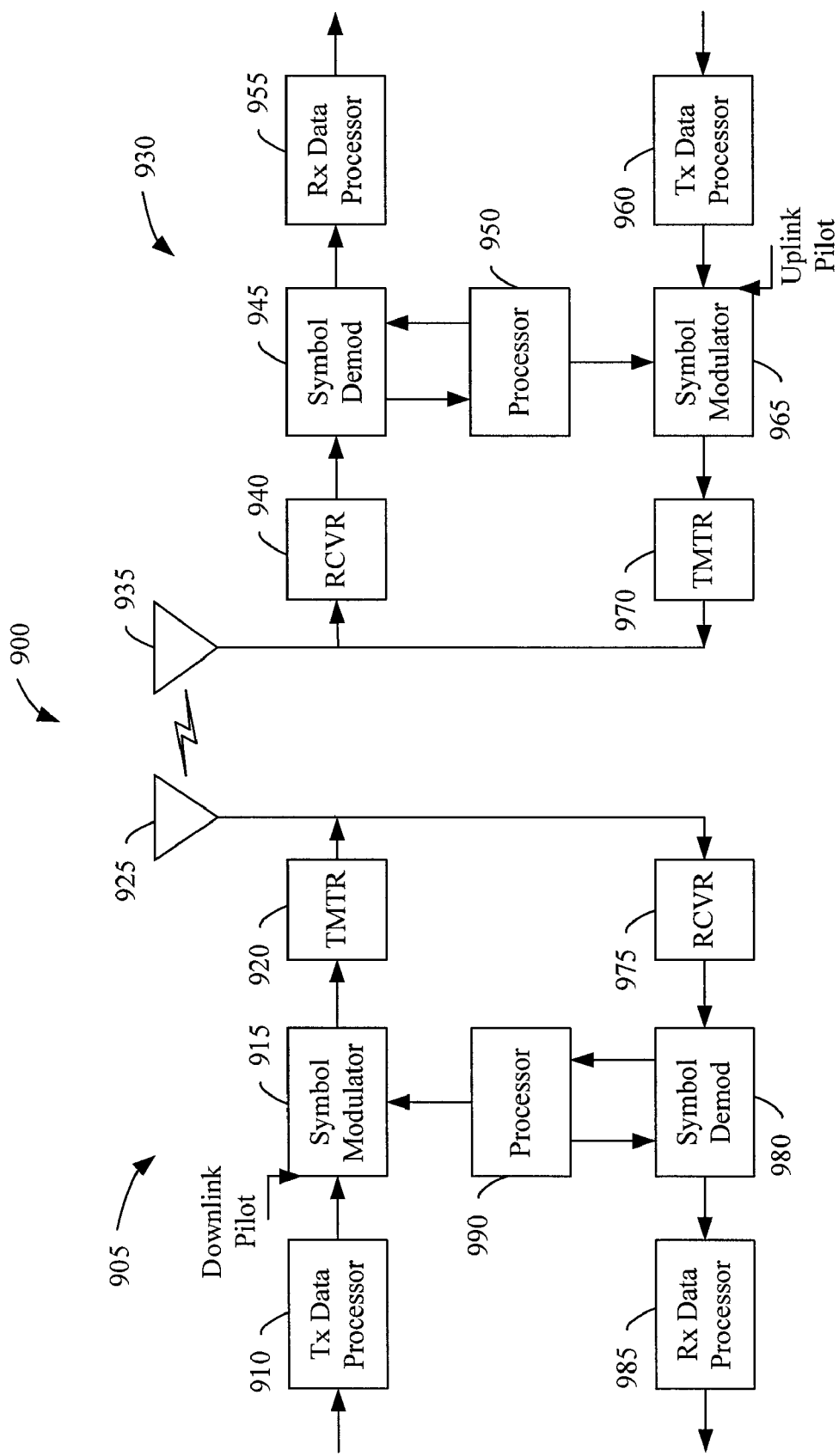
FIG. 9 is an illustration of a wireless network environment that can be employed in conjunction with the various systems and methods described herein.

FIG. 9 shows an exemplary wireless communication system 900 that may be utilized in conjunction with the various systems and methods presented herein. The wireless communication system 900 depicts one access point and one terminal for sake of brevity. However, it is to be appreciated that the system can include more than one access point and/or more than one terminal, wherein additional access points and/or terminals can be substantially similar or different for the exemplary access point and terminal described below. In addition, it is to be appreciated that the access point and/or the terminal can employ the methods (FIG. 4-6) and/or systems (FIGS. 1-3, 7, 8, and 10) described herein to facilitate wireless communication there between.

Referring now to FIG. 9, on a downlink, at access point 905, a transmit (TX) data processor 910 receives, formats, codes, interleaves, and modulates (or symbol maps) traffic data and provides modulation symbols ("data symbols"). A symbol modulator 915 receives and processes the data symbols and pilot symbols and provides a stream of symbols. A symbol modulator 920 multiplexes data and pilot symbols and provides them to a transmitter unit (TMTR) 920. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

TMTR 920 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 925 to the terminals. At terminal 930, an antenna 935 receives the downlink signal and provides a received signal to a receiver unit (RCVR) 940. Receiver unit 940 conditions (e.g., filters, amplifies, and frequency downconverts) the received signal and digitizes the conditioned signal to obtain samples. A symbol demodulator 945 demodulates and provides received pilot symbols to a processor 950 for channel estimation. Symbol demodulator 945 further receives a frequency response estimate for the downlink from processor 950, performs data demodulation on the received data symbols to obtain data symbol estimates (which are estimates of the transmitted data symbols), and provides the data symbol estimates to an RX data processor 955, which demodulates (e.g., symbol demaps), deinterleaves, and decodes the data symbol estimates to recover the transmitted traffic data. The processing by symbol demodulator 945 and RX data processor 955 is complementary to the processing by symbol modulator 915 and TX data processor 910, respectively, at access point 905.

On the uplink, a TX data processor 960 processes traffic data and provides data symbols. A symbol modulator 965 receives and multiplexes the data symbols with pilot symbols, performs modulation, and provides a stream of symbols. A transmitter unit 970 then receives and processes the stream of symbols to generate an uplink signal, which is transmitted by the antenna 935 to the access point 905.

At access point 905, the uplink signal from terminal 930 is received by the antenna 925 and processed by a receiver unit 975 to obtain samples. A symbol demodulator 980 then processes the samples and provides received pilot symbols and data symbol estimates for the uplink. An RX data processor 985 processes the data symbol estimates to recover the traffic data transmitted by terminal 930. A processor 990 performs channel estimation for each active terminal transmitting on the uplink. Multiple terminals may transmit pilot concurrently on the uplink on their respective assigned sets of pilot subbands, where the pilot subband sets may be interlaced.

Processors 990 and 950 direct (e.g., control, coordinate, manage, etc.) operation at access point 905 and terminal 930, respectively. Respective processors 990 and 950 can be associated with memory units (not shown) that store program codes and data. Processors 990 and 950 can also perform computations to derive frequency and impulse response estimates for the uplink and downlink, respectively.

For a multiple-access system (e.g., FDMA, OFDMA, CDMA, TDMA, etc.), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 990 and 950.

Figure 10:
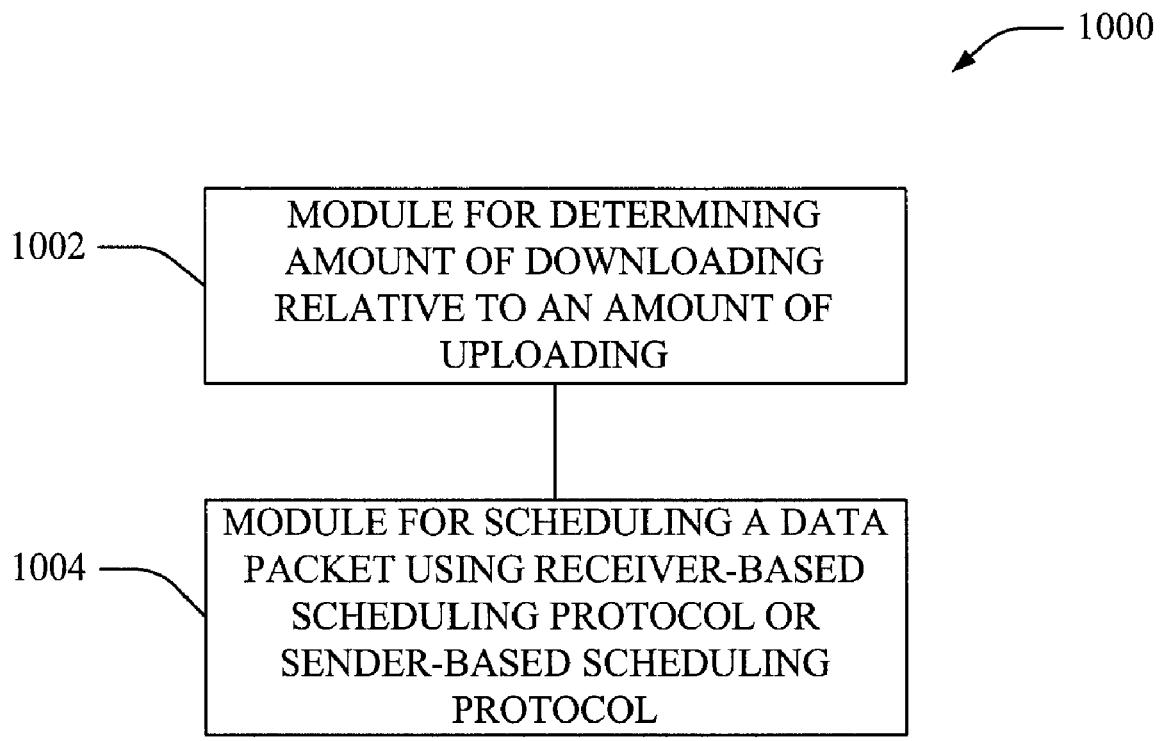
FIG. 10 is an illustration of an apparatus that facilitates dynamically scheduling data packet transfer based on a plurality of factors, in accordance with one or more aspects.

FIG. 10 is an illustration of an apparatus 1000 that facilitates dynamically scheduling data packet transfer based on a plurality of factors, in accordance with one or more aspects. Apparatus 1000 is represented as a series of interrelated functional blocks, which may represent functions implemented by a processor, software, or combination thereof (e.g., firmware) . For example, apparatus 1000 may provide modules for performing various acts such as are described above. Apparatus 1000 comprises a module for determining 1002 an amount of uploading activity to downloading activity at a node, and/or determining a ratio thereof. Module for determining 1002 may additionally evaluate one or more scheduling factors, which may include, without being limited to, routing topology (e.g., weights associated with nodes involved in the transmission), clustering (e.g., of nodes), traffic mix, interference from neighboring nodes, downloading data to uploading data ratios, incoming to outgoing connection ratios, and the like. Depending on analysis of the scheduling factors, a scheduling protocol may be selected by a module for scheduling 1004, which may determine whether to utilize a receiver-based scheduling protocol or a sender-based scheduling protocol. The determination may be based solely on the analysis of scheduling factors performed by the module for determining 1002, or may comprise an additional determination regarding whether the transmission in question is mostly download-oriented or mostly upload-oriented (e.g., whether an amount of downloaded data is greater than an amount of uploaded data, or vice versa). If it is determined that the amount of downloading is greater than the amount of uploading, then a receiver-based scheduling protocol may be employed to schedule transmission of the data packet. If the amount of downloading is not greater than the amount of uploading, then a sender-based scheduling protocol may be employed to schedule transmission of the data packet. In cases where the download and upload portions of data are equal, either scheduling protocol may be utilized. Alternatively, if desired, one or the other scheduling protocol may be designated as a preferred protocol when the data transmission comprises equal download and upload portions. Thus, apparatus 1000 facilitates dynamic scheduling of transmissions in accordance with various aspects. Apparatus 1000 may be utilized to ensure that nodes in a network operate either under sender-based scheduling or receiver-based scheduling, in a manner similar to that described above with regard the preceding figures.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art may recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of scheduling data packets for transmission in a wireless network, the method implementable by an apparatus and comprising:
   determining, by the apparatus, an amount of data waiting to be downloaded from the apparatus to a first node relative to an amount of data waiting to be uploaded from the first node to the apparatus; and
   based upon the determination:
   scheduling, by the apparatus, at least one data packet for transmission by selecting between a sender-based scheduling technique and a receiver-based scheduling technique, wherein the sender-based scheduling technique is utilized when the amount of data waiting to be downloaded is greater than the amount of data waiting to be uploaded, and the receiver-based scheduling technique is selected when the amount of data waiting to be downloaded is less than or equal to the amount of data waiting to be uploaded,
   wherein:
      the sender-based scheduling technique comprises the apparatus selecting one or more channels or subcarriers over which to transmit the at least one data packet to the first node, and
      the receiver-based scheduling technique comprises the apparatus receiving from the first node a grant to a request to send, the grant indicating one or more channels or subcarriers over which the apparatus may transmit the at least one data packet to the first node.

2. The method of claim 1, wherein utilizing further comprises analyzing at least one scheduling factor to determine whether to utilize sender-based or receiver-based scheduling.

3. The method of claim 2, wherein the at least one scheduling factor comprises at least one of routing topology, clustering of nodes, traffic mix, and interference associated with at least one node neighboring the first node.

4. The method of claim 3, wherein the traffic mix comprises a ratio of downloading data to uploading data.

5. The method of claim 3, wherein the routing topology comprises weights associated with one or more nodes involved in the transmission.

6. The method of claim 1, further comprising performing a request-grant protocol between the first node and the apparatus using the receiver-based scheduling technique.

7. The method of claim 1, further comprising permitting the first node to advertise the at least one data packet to be scheduled, and permitting the apparatus to respond that the apparatus is ready to receive the at least one data packet using sender-based scheduling.

8. The method of claim 7, further comprising transmitting the at least one data packet from the first node to the apparatus over a channel selected by the first node.

9. The method of claim 7, wherein the first node uses a paging channel to advertise.

10. An apparatus that facilitates dynamically scheduling data packet transfer, comprising:
  a determination module that determines an amount of data waiting to be downloaded from the apparatus to a first node relative to an amount of data waiting to be uploaded from the first node to the apparatus; and
  based upon the determination:
  scheduling, by a scheduler, at least one data packet for transmission by selecting between a sender-based scheduling technique and a receiver-based scheduling technique, wherein the sender-based scheduling technique is utilized when the amount of data waiting to be downloaded is greater than the amount of data waiting to be uploaded, and the receiver-based scheduling technique is selected when the amount of data waiting to be downloaded is less than or equal to the amount of data waiting to be uploaded,
  wherein:
    the sender-based scheduling technique comprises the apparatus selecting one or more channels or subcarriers over which to transmit the at least one data packet to the first node, and
    the receiver-based scheduling technique comprises the apparatus receiving from the first node a grant to a request to send, the grant indicating one or more channels or subcarriers over which the apparatus may transmit the at least one data packet to the first node.

11. The apparatus of claim 10, wherein the determination module analyzes at least one scheduling factor to determine whether to use sender-based or receiver-based scheduling.

12. The apparatus of claim 11, wherein the at least one scheduling factor comprises at least one of routing topology, clustering of nodes, and interference associated with at least one node neighboring the first node.

13. The apparatus of claim 12, wherein the routing topology comprises weights associated with one or more nodes involved in the transmission.

14. The apparatus of claim 10, wherein the determination module executes a request-grant protocol between the first node and the apparatus using the receiver-based scheduling.

15. The apparatus of claim 10, wherein the determination module advertises that the at least one data packet is ready to be scheduled, and receives a response that the apparatus is ready to receive the at least one data packet using the sender-based scheduling technique.

16. The apparatus of claim 15, further comprising a transmitter that sends the at least one data packet from the first node to the apparatus over a channel selected by an analysis module.

17. The apparatus of claim 15, wherein the determination module utilizes a paging channel to advertise.

18. An apparatus that facilitates scheduling data packets for transmission in a wireless communication environment, comprising:
  means for determining an amount of data waiting to be downloaded from the apparatus to a first node relative to an amount of data waiting to be uploaded from the first node to the apparatus; and
  means for scheduling which, based on the determination, schedule at least one data packet for transmission by selecting between a sender-based scheduling technique and a receiver-based scheduling technique, wherein the sender-based scheduling technique is utilized when the amount of data waiting to be downloaded is greater than the amount of data waiting to be uploaded, and the receiver-based scheduling technique is selected when the amount of data waiting to be downloaded is less than or equal to the amount of data waiting to be uploaded,
  wherein:
    the sender-based scheduling technique comprises the apparatus selecting one or more channels or subcarriers over which the apparatus may transmit the at least one data packet to the first node, and
    the receiver-based scheduling technique comprises the apparatus receiving from the first node a grant to a request to send, the grant indicating one or more channels or subcarriers over which the apparatus may transmit the at least one data packet to the first node.

19. The apparatus of claim 18, further comprising means for transmitting the at least one data packet.

20. The apparatus of claim 19, further comprising means for analyzing at least one scheduling factor to determine whether to employ sender-based or receiver-based scheduling.

21. The apparatus of claim 20, wherein the at least one scheduling factor comprises at least one of routing topology, clustering of nodes, and interference associated with at least one node neighboring the apparatus.

22. The apparatus of claim 21 wherein the routing topology comprises weights associated with one or more nodes involved in the transmission.

23. The apparatus of claim 18, further comprising means for performing a request-grant protocol between the apparatus and the first node using receiver-based scheduling.

24. The apparatus of claim 18, further comprising means for indicating that the at least one data packet is ready to be scheduled and means for receiving a response that the first node is ready to receive the at least one data packet using sender-based scheduling.

25. The apparatus of claim 24, wherein the means for transmitting sends the at least one data packet from the apparatus to the first node over a channel selected by the apparatus.

26. The apparatus of claim 24, wherein the means for indicating utilizes a paging channel to indicate that the at least one data packet is ready to be scheduled.

27. A non-transitory computer-readable medium having instructions stored therein for scheduling data packet transmission in a wireless communication environment, the instructions upon execution cause an apparatus to:
  determine an amount of data waiting to be downloaded from the apparatus to a first node relative to an amount of data waiting to be uploaded from the first node to the apparatus; and
  based upon the determination:
  schedule at least one data packet for transmission by selecting between a sender-based scheduling technique and a receiver-based scheduling technique, wherein the sender-based scheduling technique is utilized when the amount of data waiting to be downloaded is greater than the amount of data waiting to be uploaded, and the receiver-based scheduling technique is selected when the amount of data waiting to be downloaded is less than or equal to the amount of data waiting to be uploaded, wherein:
the sender-based scheduling technique comprises the apparatus selecting one or more channels or subcarriers over which the apparatus may transmit the at least one data packet to the first node, and
the receiver-based scheduling technique comprises the apparatus receiving from the first node a grant to a request to send, the grant indicating one or more channels or subcarriers over which the apparatus may transmit the at least one data packet to the first node.

28. The computer-readable medium of claim 27, the instructions further cause the apparatus to transmit the at least one data packet.

29. The computer-readable medium of claim 28, the instructions further cause the apparatus to analyze at least one scheduling factor to determine whether to use the sender-based scheduling protocol or the receiver-based scheduling protocol.

30. The computer-readable medium of claim 29, wherein the at least one scheduling factor comprises at least one of routing topology, clustering of nodes, and interference associated with at least one node neighboring the transmitting node.

31. The computer-readable medium of claim 30, wherein the routing topology comprises weights associated with one or more nodes involved in the transmission.

32. The computer-readable medium of claim 27, the instructions further cause the apparatus to perform a request-grant protocol between the apparatus and the first node using the receiver-based scheduling protocol.

33. The computer-readable medium of claim 27, the instructions further cause the apparatus to advertise the at least one data packet to be scheduled, and receiving a response that the first node is ready to receive the at least one data packet using the sender-based scheduling protocol.

34. The computer-readable medium of claim 33, the instructions further cause the apparatus to transmit the at least one data packet from the apparatus to the first node over a channel selected by the apparatus.

35. The computer-readable medium of claim 32, the instructions further cause the apparatus to provide an indication, over a paging channel, regarding the at least one data packet to be scheduled.

36. An access terminal for scheduling data packets for transmission, comprising:
at least one antenna;
a determination module configured to determine an amount of data waiting to be downloaded from the access terminal to a first node relative to an amount of data waiting to be uploaded from the first node to the access terminal; and
a scheduler configured to schedule, based on the determination by the determination module, at least one data packet for transmission, via the at least one antenna, by selecting between a sender-based scheduling technique and a receiver-based scheduling technique, wherein the sender-based scheduling technique is utilized when the amount of data waiting to be downloaded is greater than the amount of data waiting to be uploaded, and the receiver-based scheduling technique is selected when the amount of data waiting to be downloaded is less than or equal to the amount of data waiting to be uploaded,
wherein:
the sender-based scheduling technique comprises the access terminal selecting one or more channels or subcarriers over the access terminal may transmit the at least one data packet to the first node, and
the receiver-based scheduling technique comprises the access terminal receiving from the first node a grant to a request to send, the grant indicating one or more channels or subcarriers over which the access terminal may transmit the at least one data packet to the first node.

37. The access terminal of claim 36, wherein the determination module is further configured to analyze at least one scheduling factor comprising at least one of routing topology, clustering of nodes, and interference from neighboring nodes to determine whether to use the sender-based scheduling protocol or the receiver-based scheduling protocol.

38. The access terminal of claim 37, wherein routing topology comprises weights associated with one or more nodes involved in the transmission.

39. The access terminal of claim 36, wherein the determination module is further configured to perform a request-grant protocol between the access terminal and the first node when employing the receiver-based scheduling protocol.

40. The access terminal of claim 36, wherein the determination module is further configured to provide an indication from the access terminal regarding the at least one data packet to be scheduled and receive a response that the first node is ready to receive the at least one data packet when employing the sender-based scheduling protocol.

41. The access terminal of claim 40, further comprising a transmitter configured to transmit the at least one data packet from the access terminal to the first node over a channel selected by the access terminal.

42. An access point for scheduling data packets for transmission, comprising:
at least one antenna;
a determination module configured to determine an amount of data waiting to be downloaded between the access point and one or more access terminals relative to an amount of data waiting to be uploaded between the one or more access terminals and the access point; and
a scheduler configured to schedule, based on the determination by the determination module, at least one data packet for transmission to at least one of the one or more access terminals, via the at least one antenna, by selecting between a sender-based scheduling technique and a receiver-based scheduling technique, wherein the sender-based scheduling technique is utilized when the amount of data waiting to be downloaded is greater than the amount of data waiting to be uploaded, and the receiver-based scheduling technique is selected when the amount of data waiting to be downloaded is less than or equal to the amount of data waiting to be uploaded,
wherein:
the sender-based scheduling technique comprises the access point selecting one or more channels or subcarriers over which the access point may transmit the at least one data packet to the one or more access terminals, and
the receiver-based scheduling technique comprises the access point receiving from the one or more access terminals a grant to a request to send, the grant indicating one or more channels or subcarriers over which the access point may transmit the at least one data packet to the one or more access terminals.

* * * * *